(12) United States Patent
Stakoun

(10) Patent No.: US 12,505,492 B2
(45) Date of Patent: Dec. 23, 2025

(54) SYSTEM AND METHOD FOR REPRESENTING PAYROLL LEDGERS USING MULTITREES

(71) Applicant: Dayforce US, Inc., Minneapolis, MN (US)

(72) Inventor: Andrew Stakoun, Toronto (CA)

(73) Assignee: DAYFORCE US, INC., Minneapolis, MN (US)

( * ) Notice: Subject to any disclaimer, the term of this patent is extended or adjusted under 35 U.S.C. 154(b) by 236 days.

(21) Appl. No.: 18/262,275

(22) PCT Filed: Jan. 21, 2022

(86) PCT No.: PCT/CA2022/050090
§ 371 (c)(1),
(2) Date: Jul. 20, 2023

(87) PCT Pub. No.: WO2022/155750
PCT Pub. Date: Jul. 28, 2022

(65) Prior Publication Data
US 2024/0078613 A1 Mar. 7, 2024

Related U.S. Application Data

(60) Provisional application No. 63/139,908, filed on Jan. 21, 2021.

(51) Int. Cl.
*G06Q 40/12* (2023.01)
(52) U.S. Cl.
CPC .................................. *G06Q 40/125* (2013.12)
(58) Field of Classification Search
CPC ............. G06Q 40/125; G06Q 2220/00; G06Q 10/105; G06F 16/9027
See application file for complete search history.

(56) References Cited

U.S. PATENT DOCUMENTS

| | | | | |
|---|---|---|---|---|
| 8,370,795 B1* | 2/2013 | Sage | ....................... | G06F 9/453 |
| | | | | 717/104 |
| 9,064,285 B1* | 6/2015 | Nathoo | ................ | G06Q 40/125 |
| 10,657,607 B2* | 5/2020 | Linne | ................... | G06Q 40/125 |
| 2005/0182776 A1 | 8/2005 | Yennie | | |
| 2017/0186098 A1 | 6/2017 | Lubczynski et al. | | |
| 2017/0323396 A1* | 11/2017 | Plotko | .................. | G06Q 40/125 |
| 2019/0180244 A1 | 6/2019 | El Kharzazi | | |
| 2020/0242703 A1* | 7/2020 | Masiero | ............... | G06Q 40/125 |

FOREIGN PATENT DOCUMENTS

CA 3014787 A1 9/2017

OTHER PUBLICATIONS

International Search Report and Written Opinion of the International Searching Authority mailed Mar. 23, 2022 for PCT/CA2022/050090 (10 pages).

* cited by examiner

*Primary Examiner* — Garcia Ade
(74) *Attorney, Agent, or Firm* — The Small Patent Law Group LLC; Christopher R. Carroll

(57) ABSTRACT

The present invention provides a method, preferably a computer-implemented method, and system of representing ledgers, and specifically payroll ledgers, using multitrees. While most existing accounting, payroll, and tax systems are based on periodic calculations processing certain input data, the proposed method and system relies on defining and persisting the complete set of information required for such purposes in the form of a special type of directed acyclic graphs.

21 Claims, 3 Drawing Sheets

SYSTEM AND METHOD FOR REPRESENTING PAYROLL LEDGERS USING MULITITREES

CROSS-REFERENCE TO RELATED APPLICATIONS

This application is a national stage entry of and claims priority pursuant to 37 C.F.R. § 1.78(d) to PCT International Application No. PCT/CA2022/050090, which was filed on Jan. 21, 2022, and which claims priority to U.S. Provisional Patent Application No. 63/139,908 filed Jan. 21, 2021. The entire disclosures of these application are incorporated herein by reference.

FIELD OF THE INVENTION

This invention relates to a method and computer system for managing payroll and other payments information. In particular, payroll ledgers are represented using a specific type of directed acyclic graphs, namely multitrees, also referred to as multitree structures.

BACKGROUND OF THE INVENTION

Computer-based systems are widely employed to store, process and manage data relating to payroll for a variety of different entities from small businesses to multinational corporations, and to a variety of different payees, such as full-time employees, part-time employees and payees in the new gig-economy (essentially, self-employed payees). This payroll data must be stored, processed, managed and transmitted in a secure and efficient manner. In many instances, a record of the data and any changes made to it, must be stored in an immutable and permanent manner for future reference. For example, a payroll of an entity typically includes a record of the entity's employees and wages allocated to the employees. Information in relation to tax withheld and other contributions may be included on the payroll.

US Patent Application No. US 2017/0186098 A1 generally describes systems and methods for identifying errors in the computerized preparation of a payroll tax form to be submitted to a tax agency. The system and method in described therein apply a construct in which the rules and calculations for preparing the payroll tax form are established in declarative data structures in the form of a payroll calculation graph. This payroll calculation graph is made up of multiple interconnected calculation nodes including one or more input nodes, function nodes, and/or functional nodes. A number of payroll calculation operations are done based on the payroll calculation graph. Illustrated therein is an example of a payroll calculation graph which is used to perform payroll calculation operations in accordance with the payroll tax rules. In addition, the payroll calculation graph shown is described as a directed acyclic graph that encodes the data dependencies amongst payroll concepts or topics. Leaf nodes are populated with data accessed from a payroll program, from user inputs, from online sources, etc. Functional nodes represent a payroll tax form concept, such as a payroll tax form line item, and may be calculated or otherwise determined using a function, which together define a particular tax operation.

Canadian Patent Application No. 3,014,727 relates to a method for the transfer of cryptocurrency in a payroll context using a distributed ledger. The focus of this invention relates to methods of making sure the transfer of information (and cryptocurrency or tokens) between nodes is secure. Also disclosed are the use of a distributed ledgers "beyond the realm of cryptocurrency" in the payroll context, and all the use of smart contracts in the payroll context to process inputs and produce calculated results. A tree structure in which the logical relationships between the nodes are associated with parent and child nodes using pointers.

US Patent Application No. US 2019/0180244 A1 generally describes a system and method of applying advanced artificial intelligence to information management processes for Human Resources Management, including payroll processes. Described is a system using highly distributed storage systems (HDSS) for managing information relating to human resources. The information can include structured and unstructured data. The HDSS stores data in multiple nodes that can be quickly accessed over the largest number of nodes possible. The HDSS system is scaled either as a distributed database, or as a computer network in which users store information on a number of peer network nodes. The data added to the HDSS or node can be collected from other systems.

U.S. Pat. No. 10,657,607 implements payroll on a distributed ledger, such as blockchain, for improved security and accessibility of data. The method described therein contemplates storing a smart contract on a distributed ledger. If the first smart contract is modified, the modified contract (the "second smart contract") is stored in a second location. The first smart contract has a second clause that directs the payment of wages but has a first clause that directs that it first be determined if there is a second smart contract. If so, the second smart contract executes and payment under the modified contract is made. This patent also references the use of a distributed ledgers in the payroll context; the use of one or more smart contracts in the payroll context; a payroll event is stored at a secure off-chain location to be looked-up at the time of processing; and smart contracts to retrieve a variable such as salary, retirement plan amounts or other withholdings stored outside the blockchain and to use such variables to calculate withholdings and process payroll.

US Patent Application No. US 2020/0242703A1 relates to the use of payroll smart contracts implemented solely in a computer network for use with distributed ledgers, and to a method for controlling access to a licensed software application using a distributed blockchain. Some of the elements of the method and system include a payroll blockchain environment using payroll smart contracts implemented in a computer network for use with distributed ledgers. The smart contracts include both data and code that performs functions in a payroll context, including tax related calculations. Also disclosed is the use of a tree structure and a timeclock environment encoded in blockchain.

There remains a need for a payroll system in the form of multitree structures which, in response to payroll events entered at a parent node, immediately conducts the required calculations (e.g., such as tax withholding calculations) and assigns the result of these calculations to a child node in the multitree structure. Each payroll event is preferably immutable so that, when a correction to a payroll event is required, the parent node containing the initial, erroneous payroll event is not updated. Rather, the correction is provided in a new parent node that is operatively connected to the existing child node through operations nodes. A timeline element is updated to place the time assigned to the new node in the proper sequence and the value assigned to the child node providing the tax result is updated. The child node also becomes immutable when the pay period is over.

SUMMARY OF THE INVENTION

Accordingly, one aspect of the present invention provides a method of managing payroll information for one or more payers and one or more payees, the method comprising:
  a. providing one or more payroll ledgers, wherein each payroll ledger is in the form of a multitree structure and is associated with one payer, and wherein each of the multitree structures comprising:
    i. a plurality of origin nodes,
    ii. a plurality of timeline nodes, each timeline node is associated with one origin node,
    iii. a plurality of child nodes, each child node is associated with one origin node,
    iv. a plurality of grandchild nodes, each grandchild node is associated with at least one child node, and
    v. a plurality of subsequent descendent nodes, each subsequent descendent node is associated with at least one grandchild node,
  b. storing in one of the origin nodes a payroll ledger entry for one payee;
  c. storing in one of the timeline nodes a date associated with the payroll ledger entry in the associated origin node;
  d. receiving in the associated child node a copy of the payroll ledger entry from the origin node and performing specified calculations to generate a resulting payroll entry for the payee; and
  e. preventing the payroll ledger entry, the date and the resulting payroll entry from being altered.

In preferred embodiments, the payroll ledger entry is either predicted pay, a pay change event or a pay adjustment, and the payroll ledger entry is obtained from an input source that may be a user of the method or from a prediction generating source.

In other preferred embodiments, the method comprises at least two payroll ledgers, wherein each of the at least two payroll ledgers is associated with a different payer, and wherein the multitree structures for two or more of the payroll ledgers comprises at least one payroll ledger entry and at least one resulting payroll ledger entry for the one payee. A unique identifier is associated with the one payee.

In a further aspect, the present invention provides that the method of managing payroll and payments information is implemented on a computer system.

In yet a further aspect, the present invention provides a computer system for managing payroll and payments information for one or more payers and one or more payees, the system comprising:
  a. storage and computing means comprising one or more payroll ledgers, wherein each payroll ledger is in the form of a multitree structure and is associated with one payer, and wherein each of the multitree structures comprising:
    i. a plurality of origin nodes,
    ii. a plurality of timeline nodes, each timeline node is associated with one origin node,
    iii. a plurality of child nodes, each child node is associated with one origin node,
    iv. a plurality of grandchild nodes, each grandchild node is associated with one child node, and
    v. a plurality of subsequent descendent nodes, each subsequent descendent node is associated with one grandchild node,
  b. an input source comprising one or more of a user and a prediction-generating source, and
  c. a computer processor configured to:
    i. obtain from the input source a payroll ledger entry for one payee;
    ii. store in one of the origin nodes the payroll ledger entry;
    iii. store in each timeline node a date associated with the payroll ledger entry in the associated origin node;
    iv. store in the associated child node a copy of the payroll ledger entry and perform specified calculations using the payroll ledger entry to generate a resulting payroll entry for the payee;
    v. store in the associated grandchild node the resulting payroll entry; and
    vi. store in the associated subsequent descendent node a copy of the resulting payroll entry and perform specified calculations using the resulting payroll entry to generate a further payroll entry, and
  wherein the date, the payroll ledger entry, the resulting payroll entry and the further payroll entry cannot be altered.

In preferred embodiments, the computer processor is further configured to:
  a. receive from the input source a corrective payroll ledger entry for the payee comprising information to correct a defective payroll ledger entry;
  b. store in one of the origin nodes the corrective payroll ledger entry;
  c. store in one of the timeline nodes a corrective date associated with the corrective payroll ledger entry;
  d. store in one of the child nodes a copy of the corrective payroll ledger entry and perform specified calculations using the corrective payroll ledger entry to generate a corrective resulting payroll entry for the payee;
  e. store in one of the grandchild nodes the corrective resulting payroll entry;
  f. store in one of the subsequent descendent nodes a copy of the corrective resulting payroll entry and perform specified calculations using the corrective resulting payroll entry to generate a corrective further payroll entry for the payee; and
  wherein the corrective date, the corrective payroll ledger entry, the corrective resulting payroll entry and the corrective further payroll entry cannot be altered.

BRIEF DESCRIPTION OF THE FIGURES

The preferred embodiments of the present invention will be described with reference to the accompanying drawings in which like numerals refer to the same parts in the several views and in which.

DETAILED DESCRIPTION OF THE INVENTION

Figure 1:
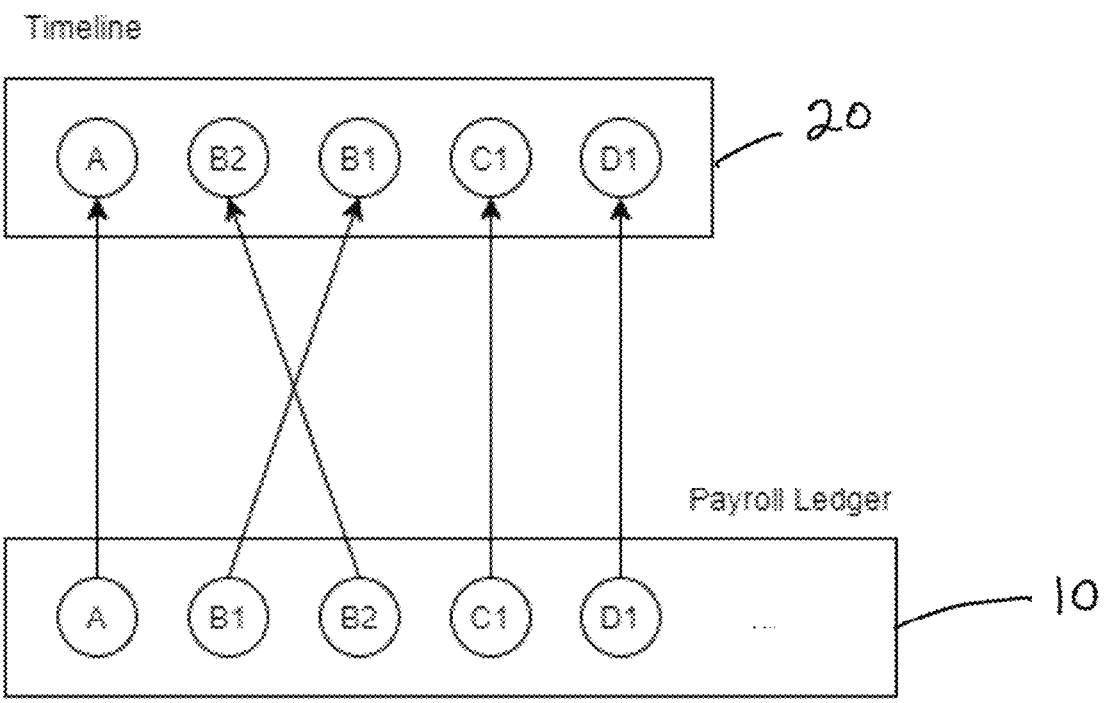
FIG. 1 shows a schematic diagram of how a payroll entry that is saved in an origin node is mapped to the timeline.

The preferred embodiments of the present invention will now be described with reference to the accompanying figures.

The present invention provides a method and system for managing payroll information in the form of multitrees. More specifically, the method represents payroll information based on at least the following three categories of payroll data: predicted pay, pay change events, and pay adjustments.

Typically, the term "payroll" is understood to refer to payment of wages from one employer to an employee or group of employees employed by that employer. However, in this specification, it will be understood and appreciated that the term "payroll" is meant to refer to the broader concept of a payments processor in which payment is made by one or more payers to one or more payees for work done or services provided by the payee(s) to the payer(s). Thus, the term "payroll" not only includes the traditional form of payment of wages by an employer to its employees, but it also includes other less traditional forms. Examples of these less traditional forms include payments to payees in the so-called "gig" economy (these payees may be contractors or self-employed individuals), and payments from two or more payers to one payee in the case where an individual works for and/or provides services to two or more payers at the same time, or within the same income reporting period.

One aspect of the present invention relates to a method, and preferably a computer implemented method, for managing payroll information for one or more payers and for one or more payees. Preferably, one or more payroll ledgers are provided for storing and managing the payroll information. Each of the payroll ledgers is in the form of a multitree structure, where the multitree structure comprises a number of different levels or categories of nodes. Each node in the multitree structure, regardless of level or category, can receive and store data or other information relating to payroll. Once the data or information is saved in a node it cannot be altered.

The first level or category of node in the multitree structure is the origin node. Origin nodes are configured to store a payroll ledger entry for one payee. Examples of payroll ledger entries that may be stored in the origin nodes include a pay entry, a predicted pay entry, a pay change event entry and a pay adjustment entry. Other payroll ledger entries may also be stored in origin nodes. A predicted pay entry is a payroll entry generated from a prediction generating source described below. A pay change event is a payroll ledger entry used to update a change in the pay of a payee, while a pay adjustment entry is a payroll ledger entry used to amend or alter a previously stored payroll pay entry.

The payroll ledger entries that are stored in the origin nodes may be inputted or obtained from a variety of input sources. Typical input sources will include a user of the method or system, such as a payer or a payee, and a prediction generating source. The user may input the payroll ledger entry using a variety of well-known methods, such as keyboard entry, mobile or web application action, or input from a metering/clocking device. Alternatively, the payroll ledger entry may be inputted from a prediction generating source that includes, for example, machine learning or other artificial intelligence methods and systems that use algorithms to predict future pay behaviours of the payees based on previous analogous pay behaviours.

Each of the origin nodes is associated with a timeline node. The timeline nodes are a second or further level or category of nodes. Each of the timeline nodes stores a date, and optionally a time, associated with the payroll entry that is stored in the associated node. For example, if the stored payroll ledger entry stored in the origin node is an entry that the payee worked an 8-hour shift, the date stored in the associated timeline entry would be the date on which that 8-hour shift was worked. As another non-limiting example, if the payroll ledger entry stored in a second origin node is a correction to the 8-hour shift pay entry that had been previously stored in a first origin node, the date stored in the second timeline node associated with the second origin node would be the date of the original 8-hour shift entry. This would allow the correction of the 8-hour shift pay entry to be correctly associated with the original pay entry.

In addition to the timeline nodes, each of the origin nodes is also associated with a child node. The child nodes are another level or category of nodes. Each child node contains instructions allowing the child node to receive a copy of the payroll ledger entry stored in the associated origin node, perform selected calculations on the payroll ledger entry to generate a resulting payroll entry for the payee that is also stored in the child node. As an example, the child node may receive from the associated origin node data that the payee worked an 8-hour shift. The child node may then calculate the gross pay owed to the payee by multiplying the 8 hours worked by the payee's hourly rate. The resulting gross pay is then stored in the child node.

Other levels or categories of nodes can be added as required. For example, each of the child nodes can be associated with a grandchild node. The grandchild nodes are another level or category of nodes beyond the child nodes level or category. Each grandchild node contains instructions allowing the grandchild node to receive a copy of the resulting payroll entry from the associated child node. As an example, the grandchild node may receive from the associated child node the resulting gross pay that was calculated and stored in the associated child node.

Beyond the level or category of grandchild nodes there may be other levels or categories of descendent nodes. The number of such levels or categories of descendent nodes may be varied as required. As an example, each of the grandchild nodes can be associated with a first level descendent node. Each first level descendent node contains instructions allowing the first level descendent node to receive a copy of the resulting payroll entry stored in the associated grandchild node, perform selected calculations on the resulting payroll entry to generate a further payroll entry that is also stored in the first level descendent node. As an example, the first level descendent node can receive from the associated grandchild node the resulting gross pay owed to the payee who had worked the 8-hour shift on a particular date. The first level descendent node may then calculate the net pay owed to the payee by deducting withholding payroll taxes or other amounts that may by law or by the payee's request be withheld. The resulting net pay is then stored in the first level descendent node.

It is preferred that each of the nodes in all the levels or categories of nodes be configured such that the data stored in the nodes cannot be altered. For example, once a payroll ledger entry is stored in an origin node, that entry can no longer be altered. Similarly, once a date is stored in an associated timeline node, or a resulting payroll entry is generated in child node, that date or entry can no longer be altered.

Since the data stored in the nodes cannot be altered, corrective data entries are required if any corrections are required to be made to the stored data entries. Corrections to stored entries may be made by receiving from the user who wants to make the correction a corrective payroll ledger entry which may include information to correct a defective payroll ledger entry. This corrective payroll ledger entry is stored in one of the origin nodes, and a date associated with the corrective payroll ledger entry is also stored in a timeline node that is associated with the origin node containing the corrective payroll ledger entry. A child node that is associated with the origin node containing the corrective payroll ledger entry is configured to receive a copy the corrective payroll ledger entry from the origin node and to perform specified calculations to generate a corrective resulting payroll entry. For example, if the user determines that a payroll ledger entry for an 8-hour shift was defective because it should have been inputted as a 9-hour shift, a corrective payroll ledger entry may be inputted and stored to correct the original 8-hour shift. In this example, the corrective payroll ledger entry would be such that it would add one hour to the original 8-hour entry. The date of the corrective payroll ledger entry is stored in an associated timeline node, and then the corrective payroll ledger entry is received in an associated child node and a calculation is made to add the extra hour worked such that the corrective resulting payroll entry is then a 9-hour shift.

Once a corrective resulting payroll entry is generated and stored in child node, the corrective resulting payroll entry can also be received and stored in one of the grandchild nodes. Subsequently, the corrective resulting payroll entry stored in the grandchild node can be received in an associated descendent node that is configured to perform a specified calculation to generate a corrective further payroll entry. In the example above, the corrective resulting payroll entry is that a 9-hour shift was worked rather than 8-hours, and the calculation may be to determine the gross pay for the 9-hour shift. This gross pay (the corrective further payroll entry) is generated and stored in the associated descendent node.

As was the case with other nodes, it is preferred that each of the nodes that contain data relating to a correction be configured such that this correction data cannot be altered. For example, once a corrective payroll ledger entry is stored in an origin node, that entry can no longer be altered. Similarly, once a date for the correction is stored in an associated timeline node, or a corrective resulting payroll entry is generated, that correction date or corrective resulting payroll entry can no longer be altered.

It will be appreciated that the method described of the present invention is preferably implemented on a computer system that is configured to manage payroll information for one or more payers and one or more payees. Such a computer system will preferably include storage and computing means comprising one or more payroll ledgers, each in the form of a multitree structure as described above. Each of the multitree structures will include a plurality of origin nodes as described above, a plurality of timeline nodes where each timeline node is associated with one origin node. Each of the multitree structures also includes a plurality of child nodes where each child node is associated with one origin node, and a plurality of grandchild nodes where each grandchild node is associated with one child node. As was described above, the multitree structures may also include as many further levels of descendent nodes. Each descendent node will be associated with one node from a previous level or category, such as, for example, a grandchild node.

The computer system of the present invention may also include an input source that may be one or more of a user and a prediction-generating source, all as described above, and a computer processor, or multiple computer processors. The computer processor or processors are configured to: obtain from the input source a payroll ledger entry for a payee and store the payroll ledger entry in one of the origin nodes of the multitree structure; store in each timeline node a date associated with the payroll ledger entry in the associated origin node; store in the associated child node a copy of the payroll ledger entry and perform specified calculations using the payroll ledger entry to generate a resulting payroll entry; store in the associated grandchild node the resulting payroll entry; and store in the associated subsequent descendent node a copy of the resulting payroll entry and perform specified calculations using the resulting payroll entry to generate a further payroll entry. All these operations performed by the computer processor or processors are preformed as described above.

Moreover, as described above, the data stored in all the nodes of the computer system cannot be altered. Specifically, data such as the payroll ledger entry, the resulting payroll entry and the further payroll entry cannot be altered once they are stored in a node. As a result, the computer processor or processors of the computer system are also configured to receive, store and generate corrective data if any data stored in any of the nodes is determined to be defective. To do so, the computer processor or processors are further configured to: receive from the input source a corrective payroll ledger entry comprising information to correct a defective payroll ledger entry; store in one of the origin nodes the corrective payroll ledger entry; store in one of the timeline nodes a corrective date associated with the corrective payroll ledger entry; store in one of the child nodes a copy of the corrective payroll ledger entry and perform specified calculations using the corrective payroll ledger entry to generate a corrective resulting payroll entry; store in one of the grandchild nodes the corrective resulting payroll entry; and store in one of the subsequent descendent nodes a copy of the corrective resulting payroll entry and perform specified calculations using the corrective resulting payroll entry to generate a corrective further payroll entry. All these operations performed by the computer processor or processors are preformed as described above.

Moreover, as described above, the corrective data stored in all the nodes cannot be altered. In particular, none of the corrective data, the corrective payroll ledger entry, the corrective resulting payroll entry and the corrective further payroll entry can be altered.

Figure 2:
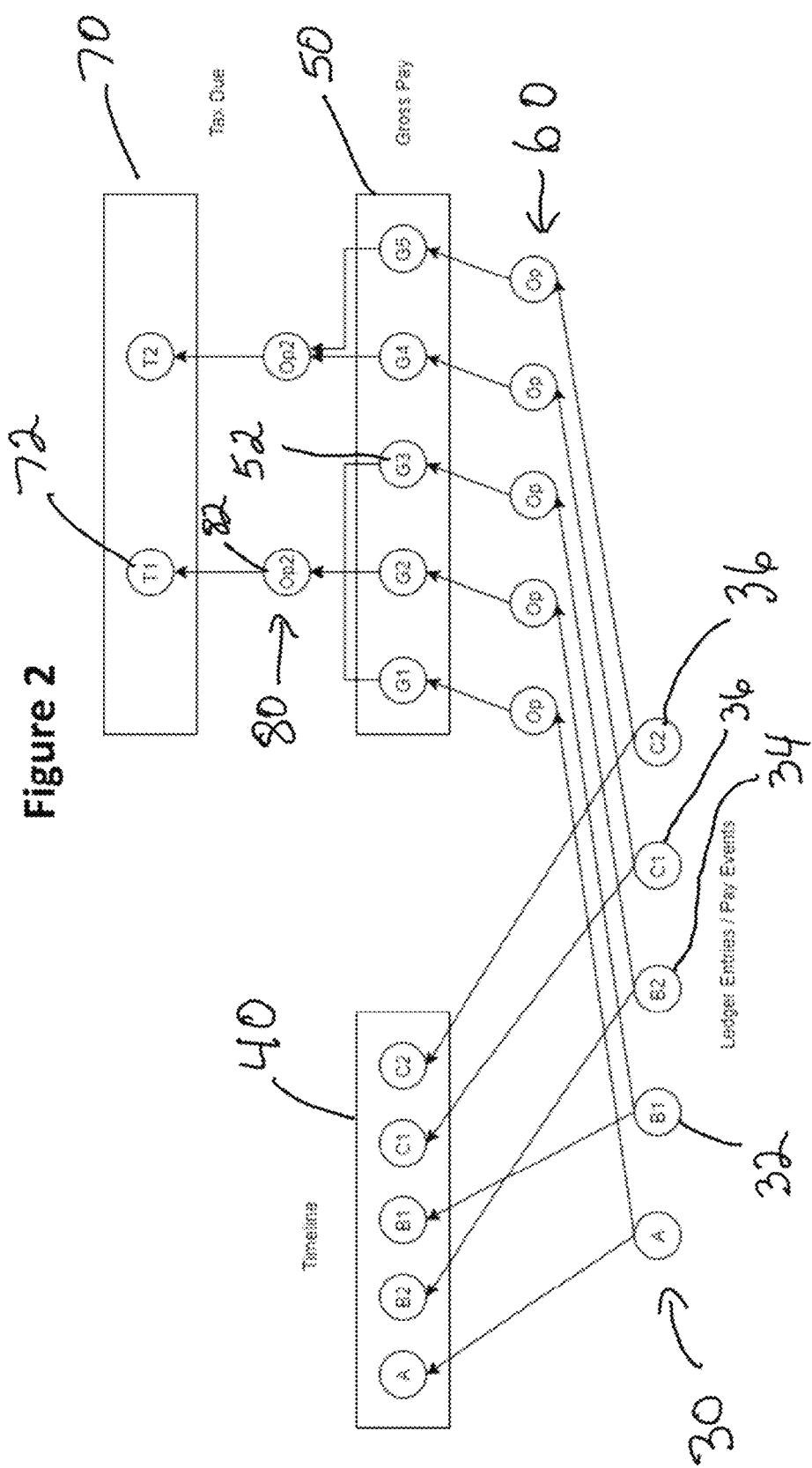
FIG. 2 shows a schematic diagram of an example of a payroll ledger in the form of a multitree structure.
Figure 3:
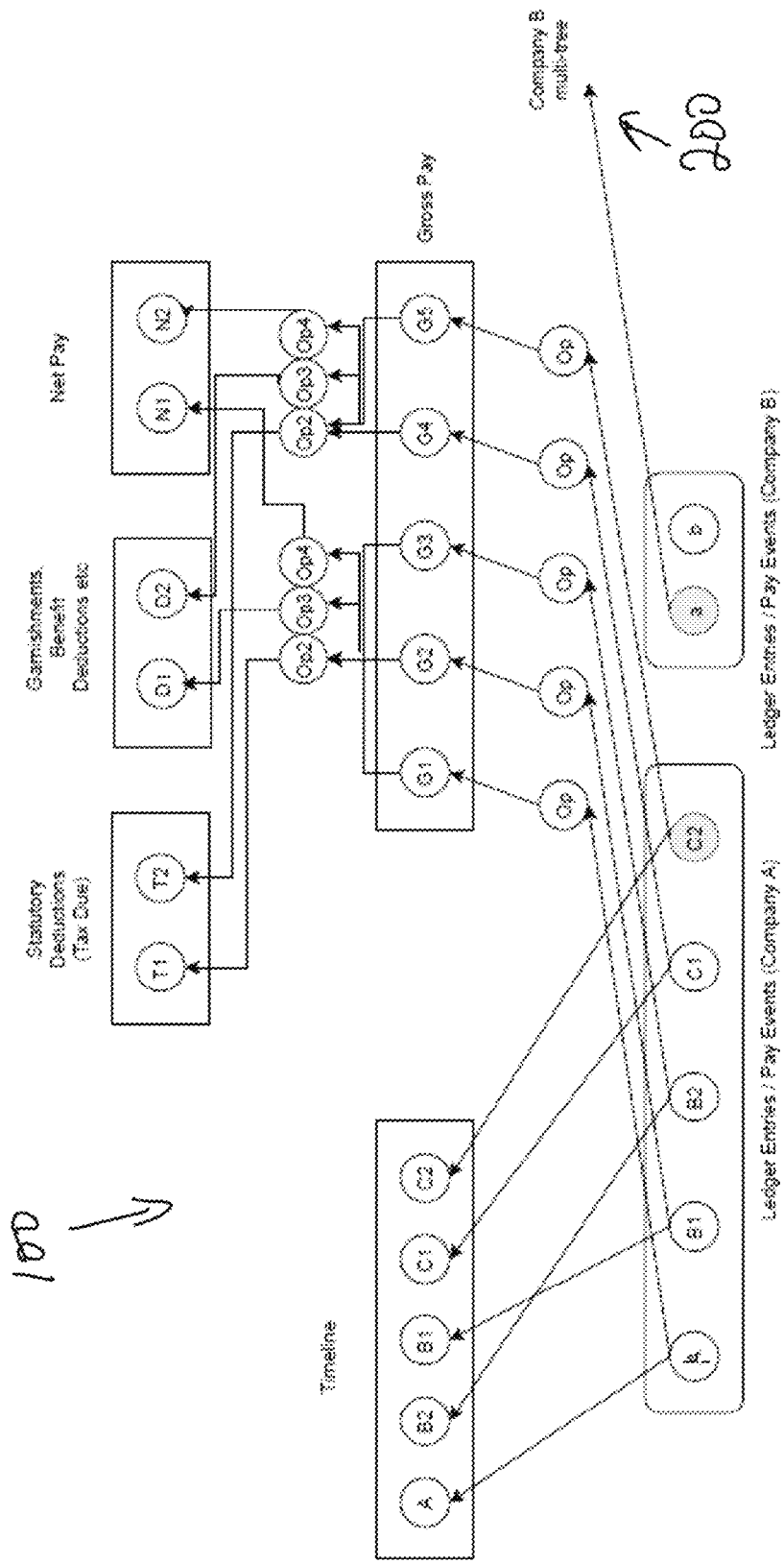
FIG. 3 shows a schematic diagram of a second example showing payroll ledgers, each in the form of a multitree structure.

A preferred method of the present invention, and a preferred computer system of the present invention, is illustrated in FIGS. 1, 2 and 3. In a preferred method, payroll ledger entries are predicted based on certain information about an upcoming service window. A service window is the most granular unit of work in the context of a payroll management system. This unit of work is associated with a period of time for which a payee, such as an employee or a freelancer in the gig economy-related use cases, is expected to be compensated. Examples of service windows include a work shift for part-time payees, a ride share arrangement for a freelance driver, or a work day for a full-time employee.

Predicted pay for each service window is considered a payroll ledger entry that is an input to the preferred method of the present invention. Predicted pay may be inputted from a prediction generating source that includes, for example, machine learning or other artificial intelligence methods and systems that use algorithms to predict future pay behaviours of the payees based on previous analogous pay behaviours. Once a new service window is defined/formalized, predicted pay for it is immediately generated and added to an origin node as a payroll ledger entry.

Pay change events are significant and durable changes that influence a payee's pay going forward. Examples of pay change events are pay rate changes (for example, pay raise of a full time employee due to a promotion, or a service rate change for a freelancer) or employment status changes, such as commencement or termination of employment.

Pay adjustments reflect the difference between the amount currently stored in a node as a payroll ledger entry for the given service window and the "correct" amount based on all the information available at a subsequent point of time. One of the typical reasons for a pay adjustment to be made is the need to reflect the difference between predicted pay and actual amount due based on any changes to the parameters of the service window.

To represent, store, and manipulate the payroll data described above, the preferred method and computer system of the present invention makes use of payroll ledgers in the form of multitrees, also referred to as multitree structures, which are a type of directed acyclic graphs (DAG) that are distinct in that the set of vertices reachable from any vertex represents a tree.

Such multitree structures are used in the preferred method of the present invention to represent information in any given payroll ledger via a combination of the origin nodes that denote payroll ledger entries, and a number of child, grandchild and descendent nodes that represent various dependent operations, actions, rules, and resulting data elements (such as tax and benefit deductions, time limits, or thresholds reached).

A first instance of a dependent operation is timeline mapping. As described above, every payroll ledger entry that is inputted and stored in an origin node is linked with an associated service window or timeline node. For example, once a predicted pay is stored in an origin node of the multitree structure, it is linked with the associated service window or timeline node. Any time a pay change event or pay adjustment must be made to a stored payroll ledger entry, a new origin node is added in which the corrective ledger entry is stored. This new origin node is linked or associated to an appropriate service window or timeline node (which at that point can be either in the past or the future).

FIG. 1 illustrates a preferred process of mapping origin nodes, generally designated as 10, to timeline nodes, generally designated as 20, and how corrective entries are linked. In FIG. 1, B1 is a predicted pay ledger entry that is related to a service entry B and that is associated with a timeline node B1, while B2 is a pay adjustment record (that is, a corrective payroll ledger entry) that is stored in a second origin node and that is related to a change in the predicted pay for the beginning of service window B. Origin node B2 has an associated timeline node B2 that, in the case of the example in FIG. 1, is chronologically before the date in timeline node B1.

As described above, one of the principles of the preferred method of the present invention is the immutability of the origin nodes 10, and therefore of the base ledger level. The preferred method provides only the ability to add origin nodes 10 with corrective payroll ledger entries, but does not allow for the modification or removal of any data stored in any of the origin nodes 10.

Another principle of the preferred method of the present invention is that records for a given service window are always stored in the same sequence in the origin nodes 10 of the base ledger level. That is, origin nodes 10 related to service window B, for example, will always be stored from B1 through BN, because node B2 was added after B1, B3 added after B2 etc. As described above, the principles of immutability and preserving sequence apply not only to the origin nodes 10, but also to every other type/level of nodes within the multitree, such as timeline nodes 20.

FIG. 2 provides an example of a multitree structure with origin nodes, general designated as 30, in the base ledger level describing pay for three service windows: A, B, and C. Based on the notation in the ledger, payroll ledger entry B1 for service window B was inputted and stored in an origin node 32 before the payroll ledger entry B2 that was subsequently inputted and stored in a second origin node 34, even though the payroll ledger entry B2 may relate to a period of time within the service window that chronologically precedes the period of time for which entry B1 relates. Likewise, payroll ledger entry C2 for service window C was inputted and stored in a third origin node 36 after the payroll ledger entry C1 in origin node 36.

The example in FIG. 2 also illustrates that, as part of the multitree structure, origin nodes A through C2 (generally designated as 30) are linked not only to their associated timeline nodes generally designated as 40, but also to associated child nodes (generally designated as 50) that are denoted G1 through G5. In the example of FIG. 2, these child nodes 50 may represent gross pay ledger entries. As part of the association between the origin nodes 30 in the base ledger level and the child nodes 50, there can be operators (generally designated as 60) configured within the multitree structure that can access any of the origin nodes 30 located in the lower level of the multitree and perform a specified calculation to generate a resulting ledger entry or value that is stored in the associated node on the level directly above (in this example, child nodes generally designated as 50 and identified as G1 through G5).

Similarly, nodes G1 through G5 (generally designated as 50) are linked to or associated with yet another level of grandchild nodes (generally designated as 70) identified as T1 and T2 (children nodes of nodes 50, G1-G5) that together comprise the Tax Due ledger entries. The link or association between the T1 and T2 grandchild nodes 70 and the G1-G5 child nodes 50 can also have associated operations, actions, or rules, which in our example are generally designated as 80 and denoted as Op2, and identifies dependent nodes related to the same tax reporting period, and so on.

Every time a new piece of information in the form of a payroll ledger entry is inputted into the preferred method or computer system of the present invention via the addition of a new origin node 30 to the base ledger level, all associated children nodes are likewise inserted into corresponding dependent levels of the multitree structure, based on the type of payroll ledger entry that was inputted and stored in the origin node 30. For example, in the case of a corrective payroll entry B2 described above, once origin node B2 (designated as 34) is added to the base ledger level and the corrective payroll entry B2 is stored in the origin node 34, a respective entry G3 is also generated and stored as a gross pay ledger entry in a child node 52. Since that gross pay ledger entry falls within the same tax reporting period as the nodes G1 and G2, its grandchild node T1 (designated as 72) will also be updated by operation Op2 (designated 82).

In the embodiment of the present invention shown in FIG. 3, the system includes two payroll ledgers, each in the form of a multitree structure, with one payroll ledger (generally designated 100) for Company A and one payroll ledger (generally designated 200) for Company B (only a very partial view of the latter payroll ledger 200 and multitree structure is shown). It will be understood, however, that there may be more than two payroll ledgers, and thus more than two multitree structures, in the method and system of the present invention. In the embodiment of FIG. 3, the multitree structures for each of the payroll ledgers 100 and 200 is as described above. The payroll ledger 100 and multitree structure for Company A is associated only with one specific payer, namely Company A, and therefore it includes payroll information for only that specific payer. Likewise, the payroll ledger 200 and multitree structure for Company B is associated only with that specific payer, namely Company B, and it includes payroll information for only that specific payer.

In the embodiment of FIG. 3, there may be at least one payee that is common to both payroll ledgers 100 and 200 and their respective multitree structures because that one payee worked for, or provided services to, both payers (Company A and Company B) at some point. This may have occurred for a variety of reasons, for example, the payee was employed by Company A at one point and then the payee left the employ of Company A and became an employee of Company B. Another reason may be that the payee is an independent contractor who provides services to Company A and Company B at various times. A further example may be that the payee is employed by Company A but also provides services to Company B as a so-called gig-worker.

In the embodiment of FIG. 3, the payroll ledger 100 and multitree structure for Company A will therefore include payroll information for the payee in respect of services provided by the payee to Company A. Likewise, the payroll ledger 200 and multitree structure for Company B will include some payroll information for the payee in respect of services provided by the payee to Company B.

In the method and system of the present invention, a unique payee identifier associated with a payee is included for each entry in the multitree structure for that payee. Therefore, at any time it is possible to easily identify and jointly process information within individual multitree structures or across more than one multitree structures that have information belonging to the same payee. One of the benefits/advantages of this approach is the ability to have a constantly balanced ledger/pay statement at the payee level within each payer's payroll ledger system. Another benefit/advantage is the ability to aggregate data from multiple payers when remitting funds (for benefits, tax, or other purposes) on behalf of the same payee (individual) to use for reporting and decision making by payers or payment processors.

A further benefit/advantage accrues to payees (such as employees and contractors). Because the method and system can keep track of payments made to the payee from multiple payers (such as when the payee changes employment or when the payee works for or provides services to more than one payer), the payee's accounting and tax reporting obligations are simplified because the method and system may be adapted to monitor, predict, and ultimately aggregate information about the payee's income, deductions, benefits, tax liabilities etc. across multiple payers.

As will be appreciated, the method and computer system of the present invention allows users, including payers and payees, to address a wide range of use cases around payroll and tax calculations and submissions, including out of cycle payroll and tax.

It is will be understood that while certain embodiments of the present invention have been described and illustrated, the present invention is not to be limited to the specific form or arrangement of steps and parts herein described and shown herein. It will be apparent to those skilled in the art that various changes or modifications may be made without departing from the scope of the invention and the present invention is not to be considered limited to what is shown in the drawings and described in the specification.

What is claimed is:

1. A method of managing payroll information for one or more payees from one or more payers that allows each of the one or more payees to receive payments from one or more of the one or more payers at the same time or within a same income reporting period, the method comprising:
   a. providing one or more payroll ledgers on a storage means of a computer system, wherein each of the payroll ledgers is in a form of a multitree structure and is associated with one of the payers, and wherein each of the multitree structures comprises:
      i. a plurality of origin nodes,
      ii. a plurality of timeline nodes, wherein each of the timeline nodes is associated with one of the origin nodes,
      iii. a plurality of child nodes, wherein each of the child nodes is associated with one of the origin nodes,
      iv. a plurality of grandchild nodes, wherein each of the grandchild nodes is associated with at least one of the child nodes, and
      v. a plurality of subsequent descendent nodes, wherein each of the subsequent descendent nodes is associated with at least one of the grandchild nodes,
   b. storing, in one of the origin nodes, a payroll ledger entry for one of the one or more payees obtained from an input source;
   c. storing, in one of the timeline nodes, a date associated with the payroll ledger entry in the associated origin node; and
   d. receiving, in the associated child node, a copy of the payroll ledger entry from the origin node and performing specified calculations using one or more processors of the computer system upon receiving the copy of the payroll ledger entry to generate a resulting payroll entry for the payee;
   wherein each of the payroll ledger entry stored in the origin node, the date stored in the timeline node, and the resulting payroll entry generated and stored in the child node, is immutable and prevented from being altered on the storage means, and
   wherein correction of the payroll ledger entry stored in the origin node, the date stored in the timeline node, or the resulting payroll entry stored in the child node requires entry of a corrective payroll ledger entry in a further one of the origin nodes.

2. The method of claim 1, wherein the payroll ledger entry is selected from the group consisting of: predicted pay, a pay change event and a pay adjustment.

3. The method of claim 1, wherein the input source comprises one or more of a user or a prediction generating source.

4. The method of claim 3, wherein the user is one of the one or more payers or one of the one or more payees.

5. The method of claim 1, further comprising the steps of:
   a. receiving, from the child node and storing in the associated grandchild node, the resulting payroll entry; and
   b. receiving, in the associated subsequent descendent node, the resulting payroll entry from the grandchild node and performing specified calculations using one or more processors of the computer system upon receiving the copy of the payroll ledger entry to generate a further payroll entry for the payee.

6. The method of claim 1, further comprising the steps of:
   a. receiving a corrective payroll ledger entry from a user, the corrective payroll ledger entry comprising information to correct a defective payroll ledger entry;
   b. storing the corrective payroll ledger entry in one of the origin nodes;

c. storing a date associated with the corrective payroll ledger entry in one of the timeline nodes;
d. receiving the corrective payroll ledger entry from the origin node in one of the child nodes and performing specified calculations using one or more processors of the computer system upon receiving the copy of the payroll ledger entry to generate a corrective resulting payroll entry;
e. receiving the corrective resulting payroll entry from the child node and storing the corrective resulting payroll entry in one of the grandchild nodes; and
f. receiving the corrective resulting payroll entry in one of the subsequent descendent nodes and performing specified calculations using one or more processors of the computer system upon receiving the copy of the payroll ledger entry to generate a corrective further payroll entry;
wherein each of the corrective payroll ledger entry stored in the origin node, the date stored in the timeline node, the corrective resulting payroll entry generated stored in the child node and the grandchild node, and the corrective further payroll entry generated and stored in the descendent node is immutable and prevented from being altered on the storage means.

7. The method of claim 1, comprising at least two payroll ledgers, wherein each of the at least two payroll ledgers is associated with a different payer of the one or more payers, and wherein the multitree structures for each of the at least two payroll ledgers comprises at least one payroll ledger entry and at least one resulting payroll ledger entry for the one of the one or more payees.

8. The method of claim 7, wherein a unique identifier is associated with the one of the one or more payees.

9. A computer-implemented method of managing payroll information for one or more payees from one or more payers that allows each of the one or more payees to receive payments from one or more of the one or more payers at the same time or within a same income reporting period, the method comprising:
a. providing one or more payroll ledgers on a storage means of a computer system, wherein each of the payroll ledgers is in a form of a multitree structure and is associated with one of the payers, and wherein each of the multitree structures comprises:
  i. a plurality of origin nodes,
  ii. a plurality of timeline nodes, wherein each of the timeline nodes is associated with one of the origin nodes,
  iii. a plurality of child nodes, wherein each of the child nodes is associated with one of the origin nodes,
  iv. a plurality of grandchild nodes, wherein each of the grandchild nodes is associated with at least one of the child nodes, and
  v. a plurality of subsequent descendent nodes, wherein each of the subsequent descendent nodes is associated with at least one of the grandchild nodes,
b. storing, in one of the origin nodes, a payroll ledger entry for one of the one or more payees obtained from an input source;
c. storing, in one of the timeline nodes, a date associated with the payroll ledger entry in the associated origin node; and
d. receiving, in the associated child node, a copy of the payroll ledger entry from the origin node and performing specified calculations using one or more processors of the computer system upon receiving the copy of the payroll ledger entry to generate a resulting payroll entry for the payee;
wherein each of the payroll ledger entry stored in the origin node, the date stored in the timeline node, and the resulting payroll entry generated and stored in the child node, is immutable and prevented from being altered on the storage means, and
wherein correction of the payroll ledger entry stored in the origin node, the date stored in the timeline node, or the resulting payroll entry stored in the child node requires entry of a corrective payroll ledger entry in a further one of the origin nodes.

10. The computer-implemented method of claim 9, wherein the payroll ledger entry is selected from the group consisting of: predicted pay, a pay change event and a pay adjustment.

11. The computer-implemented method of claim 9, wherein the input source comprises one or more of a user or a prediction generating source.

12. The computer-implemented method of claim 11, wherein the user is one of the one or more payers or one of the one or more payees.

13. The computer-implemented method of claim 9, further comprising the steps of:
a. receiving, from the child node and storing in the associated grandchild node, the resulting payroll entry; and
b. receiving, in the associated subsequent descendent node, the resulting payroll entry from the grandchild node and performing specified calculations using one or more processors of the computer system upon receiving the copy of the payroll ledger entry to generate a further payroll entry for the payee.

14. The computer-implemented method of claim 9, further comprising the steps of:
a. receiving a corrective payroll ledger entry from a user, the corrective payroll ledger entry comprising information to correct a defective payroll ledger entry;
b. storing the corrective payroll ledger entry in one of the origin nodes;
c. storing a date associated with the corrective payroll ledger entry in one of the timeline nodes;
d. receiving the corrective payroll ledger entry from the origin node in one of the child nodes and performing specified calculations using one or more processors of the computer system upon receiving the copy of the payroll ledger entry to generate a corrective resulting payroll entry;
e. receiving the corrective resulting payroll entry from the child node and storing the corrective resulting payroll entry in one of the grandchild nodes; and
f. receiving the corrective resulting payroll entry in one of the subsequent descendent nodes and performing specified calculations using one or more processors of the computer system upon receiving the copy of the payroll ledger entry to generate a corrective further payroll entry;
wherein each of the corrective payroll ledger entry stored in the origin node, the date stored in the timeline node, the corrective resulting payroll entry generated stored in the child node and the grandchild node, and the corrective further payroll entry generated and stored in the descendent node is immutable and prevented from being altered on the storage means.

15. The computer-implemented method of claim 9, comprising at least two payroll ledgers-, wherein each of the at least two payroll ledgers is associated with a different payer of the one or more payers, and wherein the multitree structures for each of the at least two payroll ledgers comprises at least one payroll ledger entry and at least one resulting payroll entry for the one of the one or more payees.

16. The computer-implemented method of claim 15, wherein a unique identifier is associated with the one of the one or more payees.

17. A computer system for managing payroll information for one or more payees from one or more payers that allows each of the one or more payees to receive payments from one or more of the one or more payers at the same time or within a same income reporting period, the system comprising:
   a. storage and computing means comprising one or more payroll ledgers on the storage means, wherein each of the one or more payroll ledgers is in a form of a multitree structure and associated with one of the one or more payers, and wherein each of the multitree structures comprises:
      i. a plurality of origin nodes,
      ii. a plurality of timeline nodes, wherein each of the timeline nodes is associated with one of the origin nodes,
      iii. a plurality of child nodes, wherein each of the child nodes is associated with one of the origin nodes,
      iv. a plurality of grandchild nodes, wherein each of the grandchild nodes is associated with one of the child nodes, and
      v. a plurality of subsequent descendent nodes, wherein each of the subsequent descendent nodes is associated with one of the grandchild nodes,
   b. an input source comprising one or more of a user and a prediction-generating source, and
   c. a computer processor configured to:
      vi. obtain, from the input source, a payroll ledger entry for one of the one or more payees;
      vii. store, in one of the origin nodes, the payroll ledger entry obtained from the input source;
      viii. store, in each of the timeline nodes, a date associated with the payroll ledger entry in the associated origin node; and
      ix. store, in the associated child node, a copy of the payroll ledger entry received from the origin node and perform specified calculations using the payroll ledger entry upon its receipt to generate a resulting payroll entry for the payee;
      x. store, in the associated grandchild node, the resulting payroll entry; and
      xi. store, in the associated subsequent descendent nodes, a copy of the resulting payroll entry received from the grandchild node and perform specified calculations using the resulting payroll entry upon its receipt to generate a further payroll entry,
   wherein each of the payroll ledger entry stored in the origin node, the date stored in the timeline node, the resulting payroll entry generated and stored in the child node and the grandchild node, and the further payroll entry generated and stored in the descendant node, is immutable and prevented from being altered on the storage means, and
   wherein correction of the payroll ledger entry stored in the origin node, the date stored in the timeline node, the resulting payroll entry stored in the child node and the grandchild node, and the further payroll entry stored in the descendant node requires entry of a corrective payroll ledger entry in a further one of the origin nodes.

18. The computer system of claim 17, wherein the payroll ledger entry is selected from the group consisting of: predicted pay, a pay change event and a pay adjustment.

19. The computer system of claim 17, wherein the computer processor is further configured to:
   a. receive, from the input source, a corrective payroll ledger entry for the one or more payees comprising information to correct a defective payroll ledger entry;
   b. store, in one of the origin nodes, the corrective payroll ledger entry;
   c. store, in one of the timeline nodes, a corrective date associated with the corrective payroll ledger entry;
   d. store, in one of the child nodes, a copy of the corrective payroll ledger entry received from the origin node and perform specified calculations using the corrective payroll ledger entry upon its receipt to generate a corrective resulting payroll entry for the one or more payees;
   e. store, in one of the grandchild nodes, the corrective resulting payroll entry; and
   f. store, in one of the subsequent descendent nodes, a copy of the corrective resulting payroll entry received from the grandchild node and perform specified calculations using the corrective resulting payroll entry upon its receipt to generate a corrective further payroll entry for the one or more payees;
   wherein each of the corrective payroll ledger entry stored in the origin node, the corrective date stored in the timeline node, the corrective resulting payroll entry generated and stored in the child node and the grandchild node, and the corrective further payroll entry generated and stored in the descendant node is immutable and prevented from being altered on the storage means.

20. The computer system of claim 17, comprising at least two payroll ledgers, wherein each of the at least two payroll ledgers is associated with a different one of the one or more payers, and wherein the multitree structures for each of the at least two payroll ledgers comprises at least one payroll ledger entry and at least one resulting payroll entry for the one of the one or more payees.

21. The computer system of claim 20, wherein a unique identifier is associated with the one of the one or more payees.

* * * * *